United States Patent
Sze et al.

(10) Patent No.: US 10,778,973 B2
(45) Date of Patent: *Sep. 15, 2020

(54) FLEXIBLE REGION BASED SAMPLE ADAPTIVE OFFSET (SAO) AND ADAPTIVE LOOP FILTER (ALF)

(71) Applicant: Texas Instruments Incorporated, Dallas, TX (US)

(72) Inventors: Vivienne Sze, Cambridge, MA (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 402 days.

This patent is subject to a terminal disclaimer.

(21) Appl. No.: 15/156,097

(22) Filed: May 16, 2016

(65) Prior Publication Data

US 2016/0269727 A1   Sep. 15, 2016

Related U.S. Application Data

(63) Continuation of application No. 13/594,701, filed on Aug. 24, 2012, now Pat. No. 9,344,743.

(Continued)

(51) Int. Cl.
*H04N 19/117*  (2014.01)
*H04N 19/132*  (2014.01)
(Continued)

(52) U.S. Cl.
CPC ......... *H04N 19/117* (2014.11); *H04N 19/132* (2014.11); *H04N 19/174* (2014.11);
(Continued)

(58) Field of Classification Search
CPC .. H04N 19/117; H04N 19/132; H04N 19/174; H04N 19/176; H04N 19/463; H04N 19/70; H04N 19/82; H04N 19/96
(Continued)

(56) References Cited

U.S. PATENT DOCUMENTS

| 2011/0096834 A1* | 4/2011 | Cheon | .......... H04N 19/119 375/240.12 |
|---|---|---|---|
| 2011/0243249 A1 | 10/2011 | Lee et al. | |

(Continued)

OTHER PUBLICATIONS

Ken McCann et al, "Samsung's Response to the Call for Proposals on Video Compression Technology", JCTVC-A124, Joint Collaborative Team on Video Coding (JCT-VC) of ITU-T SG16 WP3 and ISO/IEC JTC1/SC29/WG11, pp. 1-40, Apr. 15-23, 2010, Dresden, Germany.

(Continued)

*Primary Examiner* — Matthew K Kwan

(74) *Attorney, Agent, or Firm* — Ebby Abraham; Charles A. Brill; Frank D. Cimino

(57) ABSTRACT

A method for in-loop filtering in a video encoder is provided that includes determining filter parameters for each filtering region of a plurality of filtering regions of a reconstructed picture, applying in-loop filtering to each filtering region according to the filter parameters determined for the filtering region, and signaling the filter parameters for each filtering region in an encoded video bit stream, wherein the filter parameters for each filtering region are signaled after encoded data of a final largest coding unit (LCU) in the filtering region, wherein the in-loop filtering is selected from a group consisting of adaptive loop filtering and sample adaptive offset filtering.

4 Claims, 12 Drawing Sheets

Related U.S. Application Data

(60) Provisional application No. 61/526,975, filed on Aug. 24, 2011.

(51) Int. Cl.
*H04N 19/176* (2014.01)
*H04N 19/70* (2014.01)
*H04N 19/96* (2014.01)
*H04N 19/463* (2014.01)
*H04N 19/174* (2014.01)
*H04N 19/82* (2014.01)

(52) U.S. Cl.
CPC ......... *H04N 19/176* (2014.11); *H04N 19/463* (2014.11); *H04N 19/70* (2014.11); *H04N 19/82* (2014.11); *H04N 19/96* (2014.11)

(58) Field of Classification Search
USPC .................................................. 375/240.29
See application file for complete search history.

(56) References Cited

U.S. PATENT DOCUMENTS

| | | |
|---|---|---|
| 2011/0274158 A1 | 11/2011 | Fu et al. |
| 2012/0082241 A1 | 4/2012 | Tsai et al. |
| 2012/0082244 A1 | 4/2012 | Chen et al. |
| 2012/0106624 A1 | 5/2012 | Huang et al. |
| 2012/0170645 A1 | 7/2012 | Chien et al. |
| 2012/0177107 A1 | 7/2012 | Fu et al. |
| 2012/0294353 A1 | 11/2012 | Fu et al. |
| 2013/0034159 A1 | 2/2013 | Siekmann et al. |
| 2013/0259118 A1* | 10/2013 | Fu ..................... H04N 19/169 375/240.02 |

OTHER PUBLICATIONS

Yu-Wen Huang et al, "In-Loop Adaptive Restoration", JCTVC-B077, Joint Collaborative Team on Video Coding (JCT-VC) of ITU-T SG16 WP3 and ISO/IEC JTC1/SC29/WG11, pp. 1-11, Jul. 21-28, 2010, Geneva, Switzerland.

Chih-Ming Fu et al, "TE10 Subtest 3: Quadtree-Based Adaptive Offset", JCTVC-C147, Joint Collaborative Team on Video Coding (JCT-VC) of ITU-T SG16 WP3 and ISO/IEC JTC1/SC29/WG11, pp. 1-6, Oct. 7-15, 2010, Guangzhou, China.

Chih-Ming Fu et al, "CE8 Subset3: Picture Quadtree Adaptive Offset", JCTVC-D122, Joint Collaborative Team on Video Coding (JCT-VC) of ITU-T SG16 WP3 and ISO/IEC JTC1/SC29/WG11, pp. 1-10, Jan. 20-28, 2011, Daegu, Korea.

Chih-Ming Fu et al, "CE8 Subset3: Picture Quadtree Adaptive Offset", JCTVC-D122 Presentation, Joint Collaborative Team on Video Coding (JCT-VC) of ITU-T SG16 WP3 and ISO/IEC JTC1/SC29/WG11, pp. 1-9, Jan. 20-28, 2011, Daegu, Korea.

Chih-Ming Fu et al, "CE13: Sample Adaptive Offset with LCU-Independent Decoding", JCTVC-E049, Joint Collaborative Team on Video Coding (JCT-VC) of ITU-T SG16 WP3 and ISO/IEC JTC1/SC29/WG11, pp. 1-6, Mar. 16-23, 2011, Geneva, Switzerland.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Chih-Ming Fu et al, "Sample Adaptive Offset with LCU-Based Syntax", JCTVC-F056, Joint Collaborative Team on Video Coding (JCT-VC) of ITU-T SG16 WP3 and ISO/IEC JTC1/SC29/WG11, pp. 1-6, Jul. 14-22, 2011, Torino, Italy.

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-229, Jul. 14-22, 2011, Torino, Italy.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-237, Nov. 21-30, 2011, Geneva, Switzerland.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-261, Jul. 11-20, 2012, Stockholm, Sweden.

Benjamin Bross et al, "High Efficiency Video Coding (HEVC) Text Specification Draft 7", JCTVC-I1003_d1, Joint Collaborative Team on Video Coding (JCT-VC) of ITU-T SG16 WP3 and ISO/IEC JTC1/SC29/WG11, pp. 1-272, Apr. 27-May 7, 2012, Geneva, Switzerland.

Chih-Ming Fu et al, "CE8.a.3: SAO with LCU-Dased Syntax", JCTVC-H0273, Joint Collaborative Team on Video Coding (JCT-VC) of ITU-T SG16 WP3 and ISO/IEC JTC1/SC29/WG11, pp. 1-8, Feb. 1-10, 2012, San Jose, CA.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-259, Nov. 21-30, 2011, Geneva, Switzerland.

Chih-Ming Fu et al, "Sample Adaptive Offset for HEVC", 2011 IEEE 13th International Workshop on Multimedia Signal Processing (MMSP), pp. 1-5, Oct. 17-29, 2011, Hangzhou, China.

TMS320DM6467 Digital Media System-on-Chip, SPRS403G, Texas Instruments Incorporated, Dec. 2007, revised Oct. 2010, pp. 1-355.

Prosecution History from U.S. Appl. No. 13/594,701, dated Aug. 24, 2012 to Apr. 28, 2016, 2123 pp.

\* cited by examiner

| R0 | R1 | R2 | R3 |
| --- | --- | --- | --- |
| R4 | R5 | R6 | R7 |
| R8 | R9 | R10 | R11 |
| R12 | R13 | R14 | R15 |

| StartCode | slice_type, slice_qp _delta, ETC. | SAO PARAMETERS | ALF PARAMETERS | LCU 0 | LCU 1 | LCU 2 | LCU 3 | LCU 4 | LCU 5 |
|---|---|---|---|---|---|---|---|---|---| slice_header() | slice_data()

FIG. 5
(PRIOR ART)

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 16 | 17 | 18 | 19 | 20 | 21 | 22 | 23 | 24 | 25 | 26 | 27 | 28 | 29 | 30 | 31 |
| 32 | 33 | 34 | 35 | 36 | 37 | 38 | 39 | 40 | 41 | 42 | 43 | 44 | 45 | 46 | 47 |
| 48 | 49 | 50 | 51 | 52 | 53 | 54 | 55 | 56 | 57 | 58 | 59 | 60 | 61 | 62 | 63 |
| 64 | 65 | 66 | 67 | 68 | 69 | 70 | 71 | 72 | 73 | 74 | 75 | 76 | 77 | 78 | 79 |
| 80 | 81 | 82 | 83 | 84 | 85 | 86 | 87 | 88 | 89 | 90 | 91 | 92 | 93 | 94 | 95 |
| 96 | 97 | 98 | 99 | 100 | 101 | 102 | 103 | 104 | 105 | 106 | 107 | 108 | 109 | 110 | 111 |
| 112 | 113 | 114 | 115 | 116 | 117 | 118 | 119 | 120 | 121 | 122 | 123 | 124 | 125 | 126 | 127 |
| 128 | 129 | 130 | 131 | 132 | 133 | 134 | 135 | 136 | 137 | 138 | 139 | 140 | 141 | 142 | 143 |
| 144 | 145 | 146 | 147 | 148 | 149 | 150 | 151 | 152 | 153 | 154 | 155 | 156 | 157 | 158 | 159 |
| 160 | 161 | 162 | 163 | 164 | 165 | 166 | 167 | 168 | 169 | 170 | 171 | 172 | 173 | 174 | 175 |
| 176 | 177 | 178 | 179 | 180 | 181 | 182 | 183 | 184 | 185 | 186 | 187 | 188 | 189 | 190 | 191 |
| 192 | 193 | 194 | 195 | 196 | 197 | 198 | 199 | 200 | 201 | 202 | 203 | 204 | 205 | 206 | 207 |
| 208 | 209 | 210 | 211 | 212 | 213 | 214 | 215 | 216 | 217 | 218 | 219 | 220 | 221 | 222 | 223 |
| 224 | 225 | 226 | 227 | 228 | 229 | 230 | 231 | 232 | 233 | 234 | 235 | 236 | 237 | 238 | 239 |
| 240 | 241 | 242 | 243 | 244 | 245 | 246 | 247 | 248 | 249 | 250 | 251 | 252 | 253 | 254 | 255 |

| R0 | R1 | R2 | R3 | R4 | R5 | R6 | R7 | R8 | R9 | R10 | R11 | R12 | R13 | R14 | R15 |
|----|----|----|----|----|----|----|----|----|----|-----|-----|-----|-----|-----|-----|
|    |    |    |    |    |    |    |    |    |    |     |     |     |     |     |     |

| | | | | | | | | | | | | | | | |
|---|---|---|---|---|---|---|---|---|---|---|---|---|---|---|---|
| 15 | 31 | 47 | 63 | 79 | 95 | 111 | 127 | 143 | 159 | 175 | 191 | 207 | 223 | 239 | 255 |
| 14 | 30 | 46 | 62 | 78 | 94 | 110 | 126 | 142 | 158 | 174 | 190 | 206 | 222 | 238 | 254 |
| 13 | 29 | 45 | 61 | 77 | 93 | 109 | 125 | 141 | 157 | 173 | 189 | 205 | 221 | 237 | 253 |
| 12 | 28 | 44 | 60 | 76 | 92 | 108 | 124 | 140 | 156 | 172 | 188 | 204 | 220 | 236 | 252 |
| 11 | 27 | 43 | 59 | 75 | 91 | 107 | 123 | 139 | 155 | 171 | 187 | 203 | 219 | 235 | 251 |
| 10 | 26 | 42 | 58 | 74 | 90 | 106 | 122 | 138 | 154 | 170 | 186 | 202 | 218 | 234 | 250 |
| 9 | 25 | 41 | 57 | 73 | 89 | 105 | 121 | 137 | 153 | 169 | 185 | 201 | 217 | 233 | 249 |
| 8 | 24 | 40 | 56 | 72 | 88 | 104 | 120 | 136 | 152 | 168 | 184 | 200 | 216 | 232 | 248 |
| 7 | 23 | 39 | 55 | 71 | 87 | 103 | 119 | 135 | 151 | 167 | 183 | 199 | 215 | 231 | 247 |
| 6 | 22 | 38 | 54 | 70 | 86 | 102 | 118 | 134 | 150 | 166 | 182 | 198 | 214 | 230 | 246 |
| 5 | 21 | 37 | 53 | 69 | 85 | 101 | 117 | 133 | 149 | 165 | 181 | 197 | 213 | 229 | 245 |
| 4 | 20 | 36 | 52 | 68 | 84 | 100 | 116 | 132 | 148 | 164 | 180 | 196 | 212 | 228 | 244 |
| 3 | 19 | 35 | 51 | 67 | 83 | 99 | 115 | 131 | 147 | 163 | 179 | 195 | 211 | 227 | 243 |
| 2 | 18 | 34 | 50 | 66 | 82 | 98 | 114 | 130 | 146 | 162 | 178 | 194 | 210 | 226 | 242 |
| 1 | 17 | 33 | 49 | 65 | 81 | 97 | 113 | 129 | 145 | 161 | 177 | 193 | 209 | 225 | 241 |
| 0 | 16 | 32 | 48 | 64 | 80 | 96 | 112 | 128 | 144 | 160 | 176 | 192 | 208 | 224 | 240 |
| R0 | R1 | R2 | R3 | R4 | R5 | R6 | R7 | R8 | R9 | R10 | R11 | R12 | R13 | R14 | R15 |

FIG. 14

FLEXIBLE REGION BASED SAMPLE ADAPTIVE OFFSET (SAO) AND ADAPTIVE LOOP FILTER (ALF)

CROSS-REFERENCE TO RELATED APPLICATIONS

This application is a continuation of U.S. patent application Ser. No. 13/594,701 filed Aug. 24, 2012, which claims the benefit of U.S. Provisional Patent Application Ser. No. 61/526,975, filed Aug. 24, 2011, both of which are incorporated herein by reference in their entirety.

BACKGROUND OF THE INVENTION

Field of the Invention

Embodiments of the present invention generally relate to flexible region based sample adaptive offset (SAO) and adaptive loop filter (ALF) in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients. While H.264/AVC divides a picture into fixed size macroblocks of 16×16 samples, HEVC divides a picture into largest coding units (LCUs), of 16×16, 32×32 or 64×64 samples. The LCUs may be further divided into smaller blocks, i.e., coding units (CU), using a quad-tree structure. A CU may be split further into prediction units (PUs) and transform units (TUs). The size of the transforms used in prediction error coding can vary from 4×4 to 32×32 samples, thus allowing larger transforms than in H.264/AVC, which uses 4×4 and 8×8 transforms. As the optimal size of the above mentioned blocks typically depends on the picture content, the reconstructed picture is composed of blocks of various sizes, each block being coded using an individual prediction mode and the prediction error transform.

In a coding scheme that uses block-based prediction, transform coding, and quantization, some characteristics of the compressed video data may differ from the original video data. For example, discontinuities referred to as blocking artifacts can occur in the reconstructed signal at block boundaries. Further, the intensity of the compressed video data may be shifted. Such intensity shift may also cause visual impairments or artifacts. To help reduce such artifacts in decompressed video, the emerging HEVC standard defines three in-loop filters: a deblocking filter to reduce blocking artifacts, a sample adaptive offset filter (SAO) to reduce distortion caused by intensity shift, and an adaptive loop filter (ALF) to minimize the mean squared error (MSE) between reconstructed video and original video. These filters may be applied sequentially, and, depending on the configuration, the SAO and ALF loop filters may be applied to the output of the deblocking filter.

SUMMARY

Embodiments of the present invention relate to methods, apparatus, and computer readable media for region based in-loop filtering in video coding. In one aspect, a method for in-loop filtering in a video encoder is provided that includes determining filter parameters for each filtering region of a plurality of filtering regions of a reconstructed picture, applying in-loop filtering to each filtering region according to the filter parameters determined for the filtering region, and signaling the filter parameters for each filtering region in an encoded video bit stream, wherein the filter parameters for each filtering region are signaled after encoded data of a final largest coding unit (LCU) in the filtering region, wherein the in-loop filtering is selected from a group consisting of adaptive loop filtering and sample adaptive offset filtering.

In one aspect, a method for in-loop filtering in a video encoder is provided that includes partitioning largest coding units (LCUs) of a reconstructed picture into N×1 LCU aligned filtering regions, wherein N is an integer, determining filter parameters for each filtering region, applying in-loop filtering to each filtering region according to the filter parameters determined for the filtering region, and signaling the filter parameters for each filtering region in an encoded video bit stream, wherein the in-loop filtering is selected from a group consisting of adaptive loop filtering and sample adaptive offset filtering.

In one aspect, a method for in-loop filtering of coded video data is provided that includes receiving reconstructed video data corresponding to the coded video data, and applying in-loop filtering to each filtering region of a plurality of filtering regions of the reconstructed video data according to filter parameters determined for the filtering region, wherein the in-loop filtering is one selected from a group consisting of adaptive loop filtering and sample adaptive offset filtering, wherein the plurality of filtering regions are determined by partitioning largest coding units (LCUs) of the reconstructed video data into N×1 LCU aligned regions, wherein N is an integer.

BRIEF DESCRIPTION OF THE DRAWINGS

Particular embodiments will now be described, by way of example only, and with reference to the accompanying drawings:

FIG. 5 is an example of prior art slice based SAO and ALF parameter signaling;

FIG. 6 is an example of LCUs in raster scan order in 4×4 LCU aligned filtering regions;

FIG. 13 illustrates 16×1 LCU aligned filtering regions;

FIG. 14 is an example of LCUs in raster scan order in 16×1 LCU aligned filtering regions;

DETAILED DESCRIPTION OF EMBODIMENTS OF THE INVENTION

Figure 1:
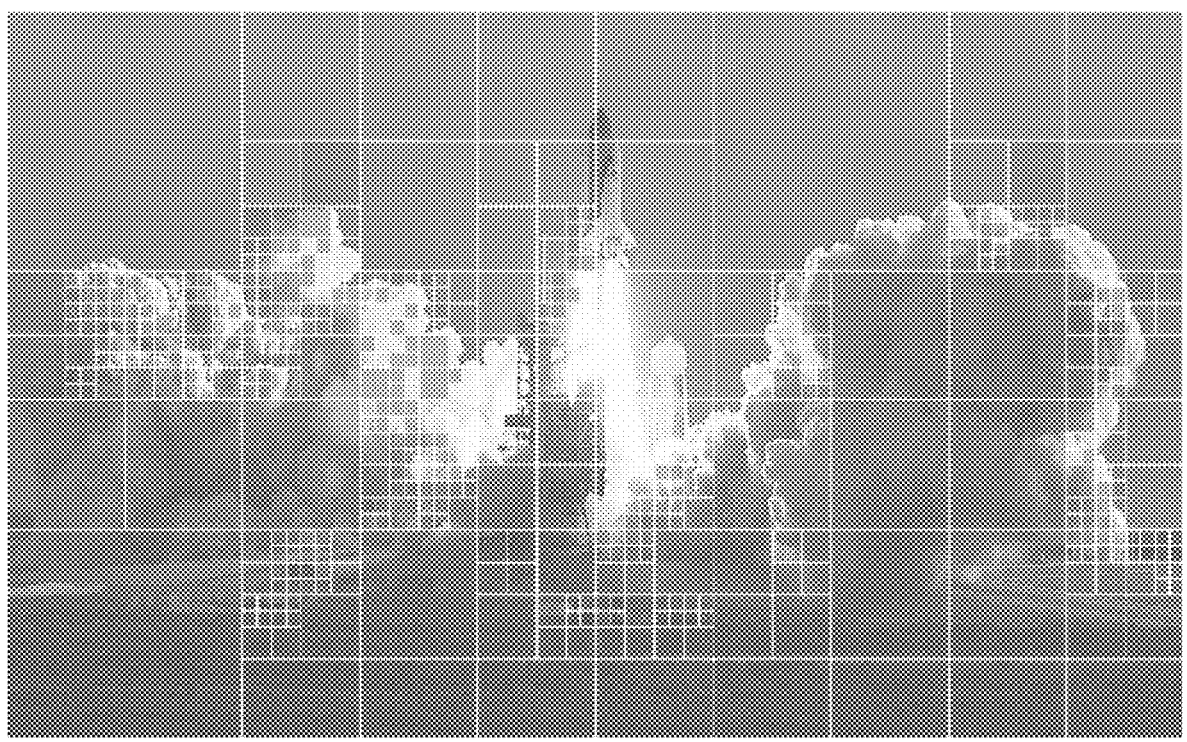
FIG. 1 is an example of quadtree based region partitioning of a picture for sample adaptive offset (SAO) filtering.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC. In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be 4×4, 8×8, 16×16, and 32×32. The sizes of the transforms units and prediction units for a CU are determined by the video encoder during prediction based on minimization of rate/distortion costs.

An LCU-aligned region of a picture is a region in which the region boundaries are also LCU boundaries. It is recognized that the dimensions of a picture and the dimensions of an LCU may not allow a picture to be evenly divided into LCUs. There may be blocks at the bottom of the picture or the right side of the picture that are smaller than the actual LCU size, i.e., partial LCUs. These partial LCUs are mostly treated as if they were full LCUs and are referred to as LCUs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), and B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8").

As previously mentioned, a sample adaptive offset (SAO) filter and an adaptive loop filter (ALF) are two of the in-loop filters included in various versions of the emerging HEVC standard. These in-loop filters are applied both in the encoder and the decoder. SAO may be applied to reconstructed pixels after application of a deblocking filter and prior to adaptive loop filtering.

In general, SAO involves adding an offset directly to a reconstructed pixel to compensate for intensity shift. The value of the offset depends on the local characteristics surrounding the pixel, i.e., edge direction/shape and/or pixel intensity level. There are two techniques used for determining offset values: band offset (BO) and edge offset (EO). In previous HEVC specifications, e.g., WD4 and WD5, for purposes of SAO, seven SAO filter types are defined: two types of BO, four types of EO, and one type for no SAO. These types are described in more detail below.

The encoder divides a reconstructed picture into LCU-aligned regions according to a top-down quadtree partitioning and decides which of the SAO filter types is to be used for each region. Each region in a partitioning contains one or more LCUs. More specifically, the encoder decides the best LCU quadtree partitioning and the SAO filter type and associated offsets for each region based on a rate distortion technique that estimates the coding cost resulting from the use of each SAO filter type. For each possible region partitioning, the encoder estimates the coding costs of the SAO parameters, e.g., the SAO filter type and SAO offsets, resulting from using each of the predefined SAO filter types for each region, selects the SAO filter type with the lowest cost for the region, and estimates an aggregate coding cost for the partitioning from the region coding costs. The partitioning with the lowest aggregate cost is selected for the picture. An example of an LCU aligned quadtree partitioning of a picture into regions for purposes of SAO is shown in FIG. 1.

Figure 2:
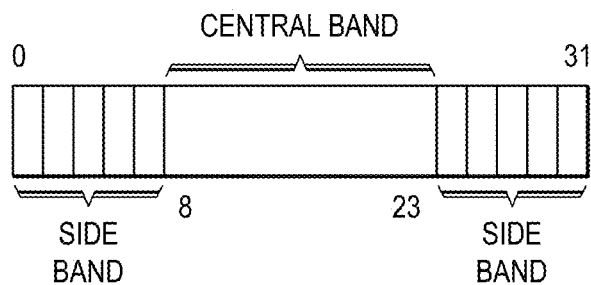
FIG. 2 illustrates band offset (BO) classification in SAO filtering.

For BO, the pixels of a region are classified into multiple bands where each band contains pixels in the same intensity interval. That is, the intensity range is equally divided into 32 bands from zero to the maximum intensity value (e.g., 255 for 8-bit pixels). Based on the observation that an offset tends to become zero when the number of pixels in a band is large, especially for central bands, the 32 bands are divided into two groups, the central 16 bands and two side bands as shown in FIG. 2. Each pixel in a region is classified according to its intensity into one of two categories: the side band group or the central band group. The five most significant bits of a pixel are used as the band index for purposes of classification. An offset is also determined for each band of the central group and each band of the side band group. The offset for a band may be computed as an average of the differences between the original pixel values and the reconstructed pixel values of the pixels in the region classified into the band.

Figure 3A:
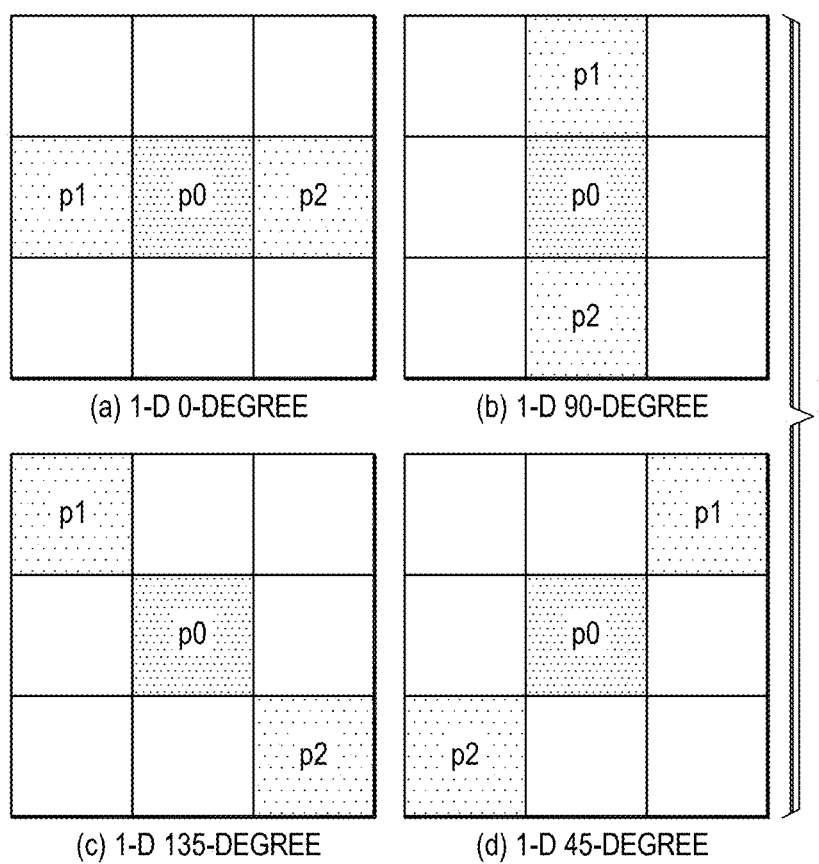
FIG. 3A illustrates edge offset (EO) classification patterns in SAO filtering.

For EO, pixels in a region are classified based on a one dimensional (1-D) delta calculation. That is, the pixels can be filtered in one of four edge directions (0, 90, 135, and 45) as shown in FIG. 3A. For each edge direction, a pixel is classified into one of five categories based on the intensity of the pixel relative to neighboring pixels in the edge direction. Categories 1-4 each represent specific edge shapes as shown in FIG. 2B while category 0 is indicative that none of these edge shapes applies. Offsets for each of categories 1-4 are also computed after the pixels are classified.

Figures 3B, 4:
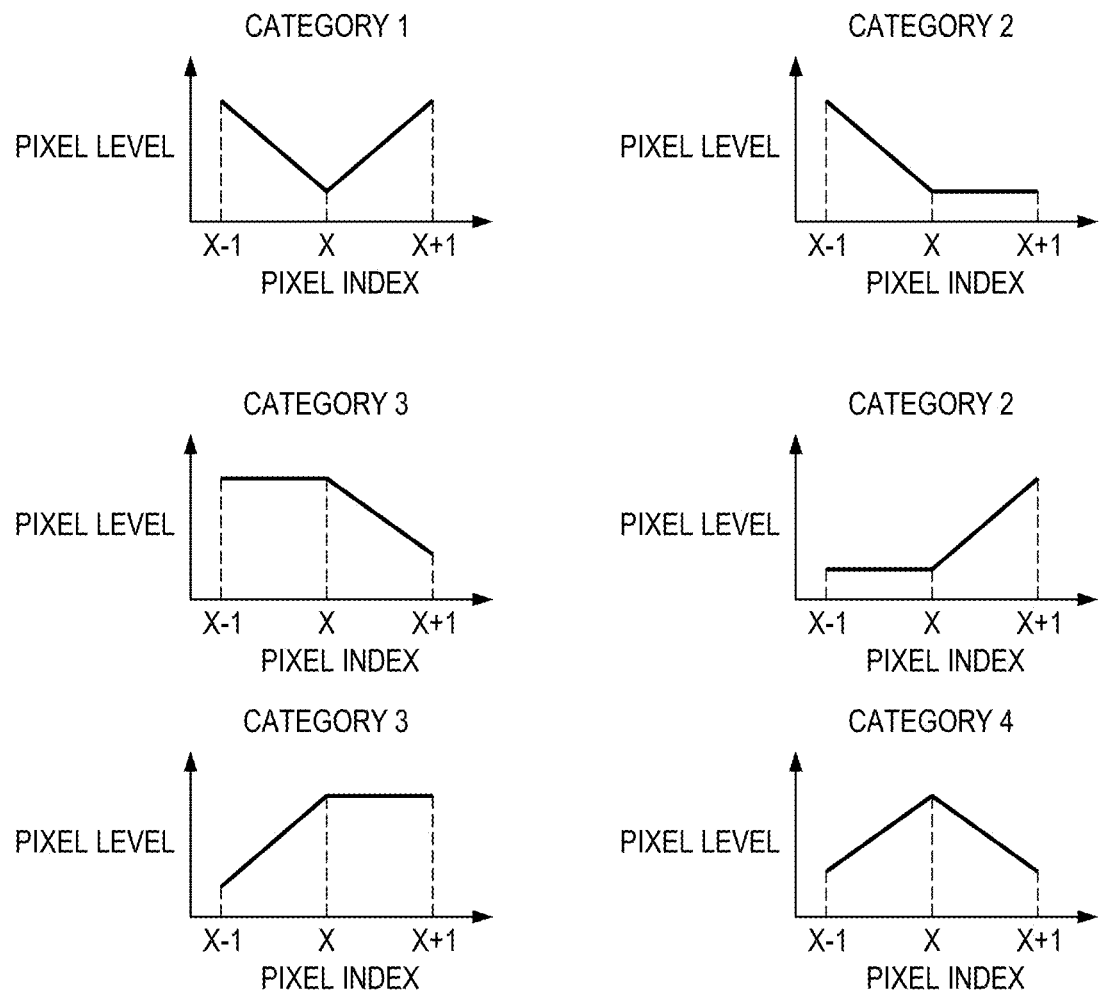
FIG. 3B illustrates edge types by EO category.
FIG. 4 illustrates 4×4 LCU aligned filtering regions.

More specifically, for each edge direction, a category number c for a pixel is computed as c=sign(p0−p1)+sign (p0−p2) where p0 is the pixel and p1 and p2 are neighboring pixels as shown in FIG. 3A. The edge conditions that result in classifying a pixel into a category are shown in Table 1 and are also illustrated in FIG. 3B. After the pixels are classified, offsets are generated for each of categories 1-4. The offset for a category may be computed as an average of the differences between the original pixel values and the reconstructed pixel values of the pixels in the region classified into the category.

TABLE 1

| Category | Condition |
|---|---|
| 1 | p0 < p1 and p0 < p2 |
| 2 | (p0 < p1 and p0 = p2) or (p0 < p2 and p0 = p1) |
| 3 | (p0 > p1 and p0 = p2) or (p0 > p2 and p0 = p1) |
| 4 | p0 > p1 and p0 > p2 |
| 0 | none of above |

Once the partitioning of the LCUs into regions and the SAO filter type and offsets for each region are determined, the encoder applies the selected SAO offsets to the reconstructed picture according to the selected LCU partitioning and selected SAO filter types for each region in the partitioning. The offsets are applied as follows. If SO type 0 is selected for a region, no offset is applied. If one of SAO filter types 1-4 is selected for a region, for each pixel in the region, the category of the pixel (see Table 1) is determined as previously described and the offset for that category is added to the pixel. If the pixel is in category 0, no offset is added.

If one of the two BO SAO filter types, i.e., SAO filter types 5 and 6, is selected for a region, for each pixel in the region, the band of the pixel is determined as previously described. If the pixel is in one of the bands for the SAO filter type, i.e., one of the central bands for SAO filter type 5 or one of the side bands for SAO filter type 6, the offset for that band is added to the pixel; otherwise, the pixel is not changed.

Further, for each picture, the encoder signals SAO parameters such as the LCU region partitioning for SAO, the SAO filter type for each LCU region, and the offsets for each LCU region in the encoded bit stream. Table 2 shows the SAO filter types (sao_type_idx) and the number of SAO offsets (NumSaoCategory) that are signaled for each filter type. Note that as many as sixteen offsets may be signaled for a region. For SAO filter types 1-4, the four offsets are signaled in category order (see Table 1). For SAO filter types 5 and 6, the 16 offsets are signaled in band order (lowest to highest).

TABLE 2

| sao_type_idx | NumSaoCategory | Edge type |
|---|---|---|
| 0 | 0 | Not applied |
| 1 | 4 | 1D 0-degree edge |
| 2 | 4 | 1D 90-degree edge |
| 3 | 4 | 1D 135-degree edge |
| 4 | 4 | 1D 45-degree edge |
| 5 | 16 | Central band |
| 6 | 16 | Side band |

In a decoder, the SAO parameters for a slice are decoded, and SAO filtering is applied according to the parameters. That is, the decoder applies SAO offsets to the LCUs in the slice according to the signaled region partitioning for the picture and the signaled SAO filter type and offsets for each of the regions. The offsets for a given region are applied in the same way as previously described for the encoder.

In general, ALF selectively applies a 10-tap FIR filter to reconstructed pixels in a picture (after deblocking filtering and SAO filtering). In previous versions of the HEVC standard, several filter shapes are defined and the encoder selects one filter shape for a picture and up to 16 sets of coefficients for the filter shape. The selected filter shape and the sets of coefficients are signaled to the decoder in slice headers. Typically, the encoder uses a Wiener filter technique to choose coefficients that minimize the SSE (sum of square error) between the reconstructed pixels and the original pixels.

Two types of ALF filtering are provided: block based and region based. In block based ALF, a picture is divided into 4×4 blocks of pixels and each block is classified into one of 16 categories. The category of the block determines which of the coefficient sets is to be used (out of a maximum of 16 coefficient sets) in applying the selected filter to the pixels in the block. Filtering may also be turned on and off on a CU basis. The encoder determines whether or not ALF is to be applied to each CU and signals a map to the decoder that indicates whether or not ALF is to be used for each CU. To apply the selected filter to a picture, ALF uses a Laplacian-based local activity to switch between the sets of filter coefficients on a 4×4 block-by-block basis.

In region based ALF, a picture is divided into sixteen LCU aligned filtering regions, i.e., 4×4 regions of LCUs, as shown in FIG. 4. Each filtering region is classified into one of 16 categories, which determines which of the coefficient sets is to be used in applying the selected filter to the pixels in the filtering region. The encoder selects the coefficient set for each filtering region and signals the selection to the encoder.

The dimensions of the filtering regions in terms of LCUs depend on the dimensions of the picture and the dimensions of an LCU. The region dimensions may be determined as follows:

$$x\text{Width}=(((\text{PicWidthInLCUs}+1)>>2)<<\text{Log 2LCUSize})$$

$$y\text{Height}=(((\text{PicHeightInLCUs}+1)>>2)<<\text{Log 2LCUSize})$$

where xWidth is the width of a filtering region and yHeight is the height of a filtering region when the picture is divided into 4×4 regions, and Log 2LCUSize is log 2(LCUSize), e.g., if the LCU size is 64, log 2LCUsize will be 6.

The picture-based processing of SAO to estimate the offsets, determine whether to use EO or BO, and to determine region configurations based on a quadtree can be an issue for low latency video coding applications (I, video conferencing or cloud computing) as such processing introduces a minimum of a one picture delay. More specifically, as shown in the example of FIG. 5, the SAO parameters for LCUs in a slice of a picture are encoded in the slice header. Due to the picture based SAO processing, these parameters are not known until all the LCUs in a picture have been coded. A delay in LCU processing is also incurred in the decoder as all data for SAO of LCUs in a slice has to be decoded and stored before processing of the LCU data in the slice data can begin. Moreover, the decoded SAO parameters for the entire slice have to be stored before LCU decoding is started, which may increase the memory requirements in a decoder.

The region-based processing of ALF also introduces some delay in the encoder. As shown in the example of FIG. 5, the ALF parameters for LCUs in a slice are signaled in the slice header. These parameters, which include, e.g., filter coefficients and on/off flags, are not known until the filtering regions containing those LCUs are processed. Because ALF coefficients are determined independently for each region, the encoder may process regions in parallel to determine coefficients which reduces the latency but does not eliminate it. However, the determination of ALF coefficients for a filtering region cannot be started until all the LCUs in the filtering region have been coded, reconstructed, and deblocked in the encoder. Consider the simple example of FIG. 6. In this example, a picture with 16 rows of 16 LCUs is divided into the 16 LCU aligned 4×4 filtering regions. Assuming raster scan order, before an encoder can begin determining the ALF coefficients for filtering region R0, at least LCUs 0-51 have to be processed by the encoder and the LCUs in the region have to be reconstructed and deblocked.

Embodiments of the invention provide alternative techniques for ALF and SAO parameter determination and signaling of SAO and ALF parameters that may be used to reduce the encoder delay of current techniques. In some embodiments, a region based SAO is provided that enables the determination of SAO parameters for the filtering regions to be performed in parallel. In some such embodiments, rather than signaling the SAO parameters in a slice header, the SAO parameters for each filtering region in a slice may be signaled in the slice data at the end of the region data, i.e., the region SAO parameters may be interleaved with the region data. In some embodiments, for region-based ALF, rather than signaling the ALF parameters in a slice header, the ALF parameters for each filtering region in a slice may be signaled in the slice data after at the end of the region data, i.e., the region ALF parameters may be interleaved with the region data. In some embodiments, an alternative region configuration for region-based determination of ALF parameters and/or SAO parameters is provided that may reduce the delay caused by the current ALF region configuration in combination with raster scan processing of LCUs.

Figure 7:
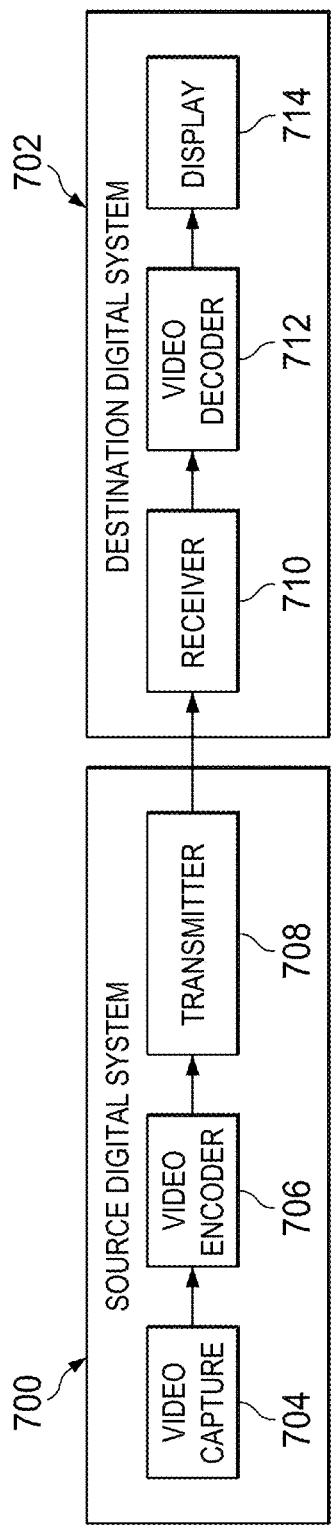
FIG. 7 is a block diagram of a digital system.

FIG. 7 shows a block diagram of a digital system that includes a source digital system 700 that transmits encoded video sequences to a destination digital system 702 via a communication channel 716. The source digital system 700 includes a video capture component 704, a video encoder component 706, and a transmitter component 708. The video capture component 704 is configured to provide a video sequence to be encoded by the video encoder component 706. The video capture component 704 may be, for example, a video camera, a video archive, or a video feed from a video content provider. In some embodiments, the video capture component 704 may generate computer graphics as the video sequence, or a combination of live video, archived video, and/or computer-generated video.

The video encoder component 706 receives a video sequence from the video capture component 704 and encodes it for transmission by the transmitter component 708. The video encoder component 706 receives the video sequence from the video capture component 704 as a sequence of pictures, divides the pictures into largest coding units (LCUs), and encodes the video data in the LCUs. The video encoder component 706 may be configured to perform region based SAO and/or region based ALF filtering during the encoding process as described herein. An embodiment of the video encoder component 706 is described in more detail herein in reference to FIG. 8.

The transmitter component 708 transmits the encoded video data to the destination digital system 702 via the communication channel 716. The communication channel 716 may be any communication medium, or combination of communication media suitable for transmission of the encoded video sequence, such as, for example, wired or wireless communication media, a local area network, or a wide area network.

The destination digital system 702 includes a receiver component 710, a video decoder component 712 and a display component 714. The receiver component 710 receives the encoded video data from the source digital system 700 via the communication channel 716 and provides the encoded video data to the video decoder component 712 for decoding. The video decoder component 712 reverses the encoding process performed by the video encoder component 706 to reconstruct the LCUs of the video sequence. The video decoder component 712 may be configured to perform region based SAO and/or region based ALF filtering during the decoding process as described herein. An embodiment of the video decoder component 712 is described in more detail below in reference to FIG. 9.

The reconstructed video sequence is displayed on the display component 714. The display component 714 may be any suitable display device such as, for example, a plasma display, a liquid crystal display (LCD), a light emitting diode (LED) display, etc.

In some embodiments, the source digital system 700 may also include a receiver component and a video decoder component and/or the destination digital system 702 may include a transmitter component and a video encoder component for transmission of video sequences both directions for video steaming, video broadcasting, and video telephony. Further, the video encoder component 706 and the video decoder component 712 may perform encoding and decoding in accordance with one or more video compression standards. The video encoder component 706 and the video decoder component 712 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 8:
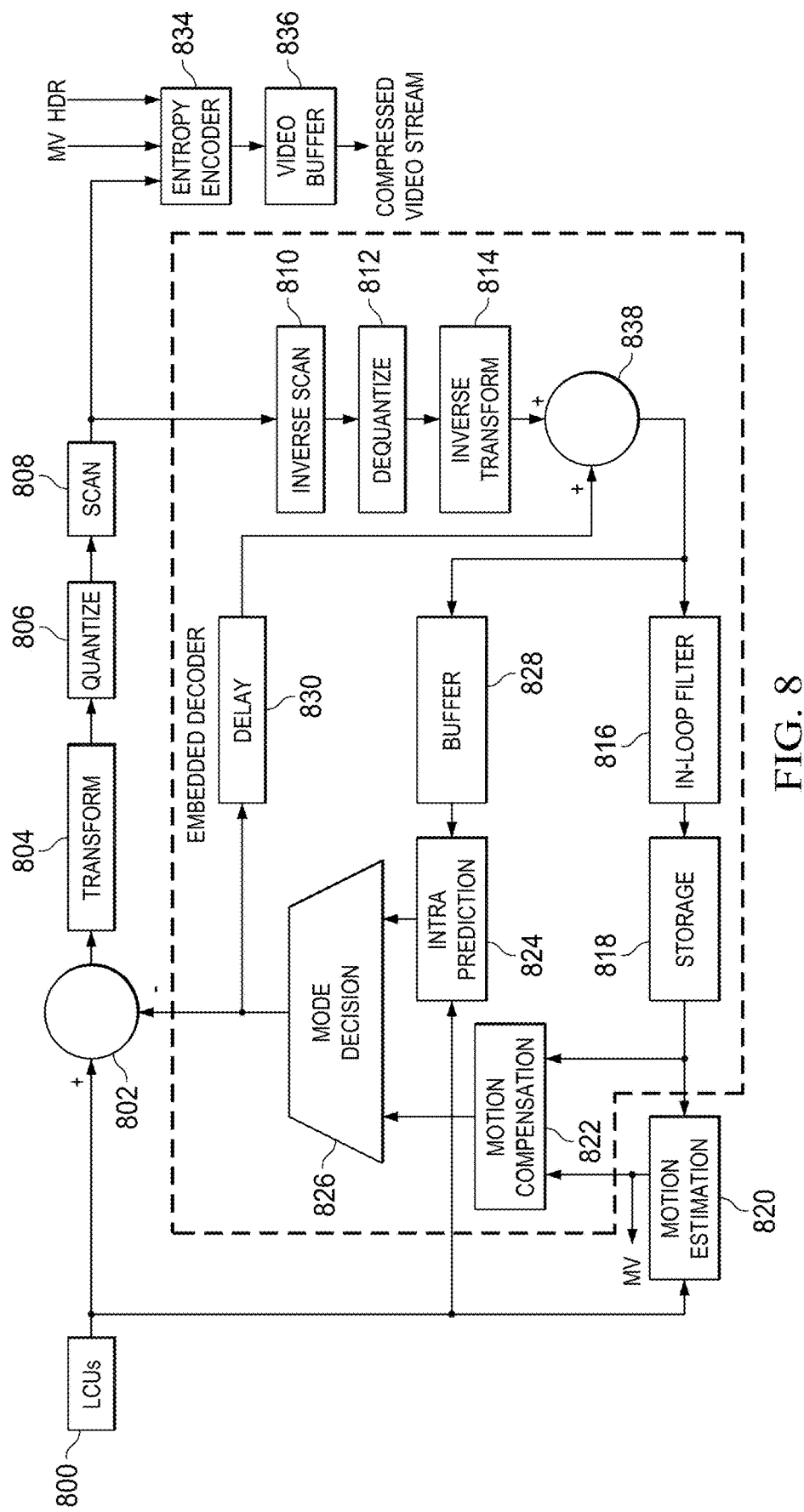
FIG. 8 is a block diagram of a video encoder.

FIG. 8 shows a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs of the input video sequence from the coding control component and encodes the LCUs under the control of the coding control component to generate the compressed video stream. The LCUs in each picture are processed in row order. The CUs in the CU structure of an LCU may be processed by the LCU processing in a depth-first Z-scan order. The LCUs 800 from the coding control unit are provided as one input of a motion estimation component 820, as one input of an intra-prediction component 824, and to a positive input of a combiner 802 (e.g., adder or subtractor or the like). Further, although not specifically shown, the prediction mode of each picture as selected by the coding control component is provided to a mode selector component and the entropy encoder 834.

The storage component 818 provides reference data to the motion estimation component 820 and to the motion compensation component 822. The reference data may include one or more previously encoded and decoded pictures, i.e., reference pictures.

The motion estimation component 820 provides motion data information to the motion compensation component 822 and the entropy encoder 834. More specifically, the motion estimation component 820 performs tests on CUs in an LCU based on multiple inter-prediction modes (e.g., skip mode, merge mode, and normal or direct inter-prediction), PU sizes, and TU sizes using reference picture data from storage 818 to choose the best CU partitioning, PU/TU partitioning, inter-prediction modes, motion vectors, etc. based on a rate distortion coding cost. To perform the tests, the motion estimation component 820 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU.

The motion estimation component 820 provides the motion vector (MV) or vectors and the prediction mode for each PU in the selected CU partitioning to the motion compensation component 822 and the selected CU/PU/TU partitioning with corresponding motion vector(s), reference picture index (indices), and prediction direction(s) (if any) to the entropy encoder 834.

The motion compensation component 822 provides motion compensated inter-prediction information to the mode decision component 826 that includes motion compensated inter-predicted PUs, the selected inter-prediction modes for the inter-predicted PUs, and corresponding TU sizes for the selected CU partitioning. The coding costs of the inter-predicted CUs are also provided to the mode decision component 826.

The intra-prediction component 824 provides intra-prediction information to the mode decision component 826 and the entropy encoder 834. More specifically, the intra-prediction component 824 performs intra-prediction in which tests on CUs in an LCU based on multiple intra-prediction modes, PU sizes, and TU sizes are performed using reconstructed data from previously encoded neighboring CUs stored in the buffer 828 to choose the best CU partitioning, PU/TU partitioning, and intra-prediction modes based on a rate distortion coding cost. To perform the tests, the intra-prediction component 824 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction information provided to the mode decision component 826 includes the intra-predicted PUs, the selected intra-prediction modes for the PUs, and the corresponding TU sizes for the selected CU partitioning. The coding costs of the intra-predicted CUs are also provided to the mode decision component 826. The intra-prediction information provided to the entropy encoder 834 includes the selected CU/PU/TU partitioning with corresponding intra-prediction modes.

The mode decision component 826 selects between intra-prediction of a CU and inter-prediction of a CU based on the intra-prediction coding cost of the CU from the intra-prediction component 824, the inter-prediction coding cost of the CU from the inter-prediction component 820, and the picture prediction mode provided by the mode selector component. Based on the decision as to whether a CU is to be intra- or inter-coded, the intra-predicted PUs or inter-predicted PUs are selected, accordingly.

The output of the mode decision component 826, i.e., the predicted PUs, is provided to a negative input of the combiner 802 and to a delay component 830. The associated transform unit size is also provided to the transform component 804. The output of the delay component 830 is provided to another combiner (i.e., an adder) 838. The combiner 802 subtracts each predicted PU from the original PU to provide residual PUs to the transform component 804. Each resulting residual PU is a set of pixel difference values that quantify differences between pixel values of the original PU and the predicted PU. The residual blocks of all the PUs of a CU form a residual CU block for the transform component 804.

The transform component 804 performs block transforms on the residual CU to convert the residual pixel values to transform coefficients and provides the transform coefficients to a quantize component 806. More specifically, the transform component 804 receives the transform unit sizes for the residual CU and applies transforms of the specified sizes to the CU to generate transform coefficients.

The quantize component 806 quantizes the transform coefficients based on quantization parameters (QPs) and quantization matrices provided by the coding control component and the transform sizes. The quantized transform coefficients are taken out of their scan ordering by a scan component 808 and arranged sequentially for entropy coding. In essence, the coefficients are scanned backward in highest to lowest frequency order until a coefficient with a non-zero value is located. Once the first coefficient with a non-zero value is located, that coefficient and all remaining coefficient values following the coefficient in the highest to lowest frequency scan order are serialized and passed to the entropy encoder 834.

The entropy encoder 834 entropy encodes the relevant data, i.e., syntax elements, output by the various encoding components and the coding control component to generate the compressed video bit stream that is provided to a video buffer 836 for transmission or storage. The syntax elements are encoded according to the syntactical order specified in HEVC. This syntactical order specifies the order in which syntax elements should occur in a compressed video bit stream. Among the syntax elements that are encoded are flags indicating the CU/PU/TU partitioning of an LCU, the prediction modes for the CUs, and the ordered quantized transform coefficients for the CUs. The entropy encoder 834 also codes relevant data from the in-loop filtering component 816 such as ALF parameters, e.g., filter type and filter coefficients, and SAO parameters, e.g., filter type and offsets.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a CU provided via the scan component 808 are returned to their original post-transform arrangement by an inverse scan component 810, the output of which is provided to a dequantize component 812, which outputs a reconstructed version of the transform result from the transform component 804.

The dequantized transform coefficients are provided to the inverse transform component 814, which outputs estimated residual information representing a reconstructed version of a residual CU. The inverse transform component 814 receives the transform unit size used to generate the transform coefficients and applies inverse transform(s) of the specified size to the transform coefficients to reconstruct the residual values.

The reconstructed residual CU is provided to the combiner 838. The combiner 838 adds the delayed selected CU to the reconstructed residual CU to generate a reconstructed CU, which becomes part of reconstructed picture data. The reconstructed picture data is stored in a buffer 828 for use by the intra-prediction component 824 and is provided to an in-loop filter component 816.

Figure 9:
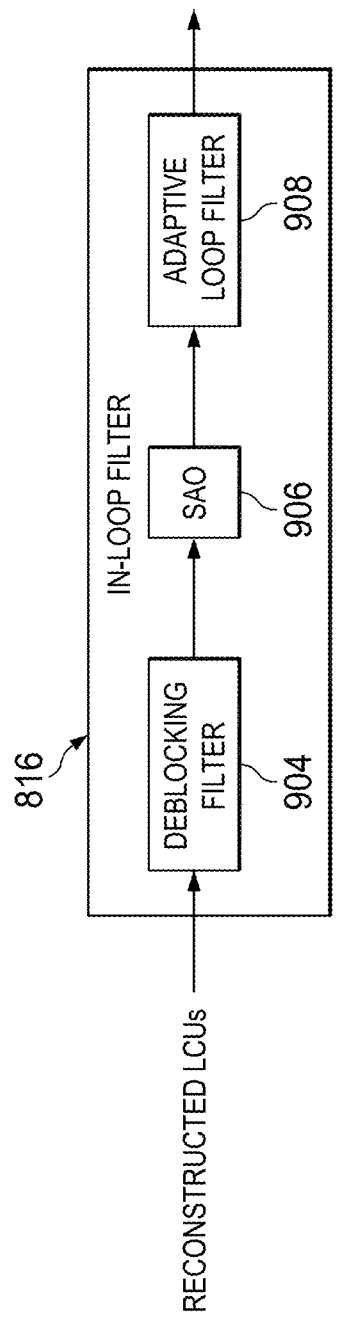
FIG. 9 is a block diagram of the in-loop filter component of the video encoder.

The in-loop filter component 816 applies various filters to the reconstructed picture data to improve the quality of the reference picture data used for encoding/decoding of subsequent pictures. FIG. 9 shows the in-loop filter component 816 in more detail. The filters included in the in-loop filter component 816 include a deblocking filter 904, a sample adaptive offset filter (SAO) 906, and an adaptive loop filter (ALF) 908. The in-loop filter component 816 may apply the various filters, for example, on an LCU-by-LCU basis. The three filters may be applied sequentially as shown in FIG. 9. That is, the deblocking filter 904 may be first applied to the reconstructed data. Then, the SAO 906 may be applied to the deblocked reconstructed picture data, and the ALF 908 is applied to the SAO filtered reconstructed picture data. Referring again to FIG. 8, the final filtered reference picture data is provided to storage component 818.

In general, the deblocking filter 904 operates to smooth discontinuities at block boundaries, i.e., TU and CU block boundaries, in a reconstructed picture. In general, the ALF 908 implements an adaptive Wiener filtering technique to minimize distortion in the reconstructed picture as compared to the original picture. The ALF 908 may be region-based. That is, the ALF 908 may select a filter type for a picture from a predefined set of filter types, determine one or more sets of filter coefficients for the selected filter type, divide the picture into filtering regions, and select a set of filter coefficients for each region to be used in applying the filter type to the pixels. The ALF 908 also applies the selected filter to each region using the set of coefficients selected for the region. The selected filter type and the coefficients sets are sent to the entropy encoder 834 to be signaled to the decoder. Embodiments of the ALF 908 may implement techniques for region-based processing and/or signaling of ALF parameters as described herein in reference to the method of FIG. 12.

In general, the SAO filter 906 determines the best offset values, i.e., band offset values or edge offset values, to be added to pixels of a reconstructed picture to compensate for intensity shift that may have occurred during the block based coding of the picture and applies the offset values to the reconstructed picture. The SAO filter 906 may be region-based. That is, the SAO filter 906 may divide the picture into filtering regions, determine the best offset values for each filtering region, and apply those offset values to the region. The region offset values along with other parameters that together indicate the type of filtering to be applied, i.e., BO or EO, and any other information needed in order to apply the offset values are sent to the entropy encoder 834 to be signaled to the decoder. Embodiments of the SAO filter 906 may implement techniques for region-based processing and/or signaling of SAO parameters as described herein in reference to the method of FIG. 12.

Figure 10:
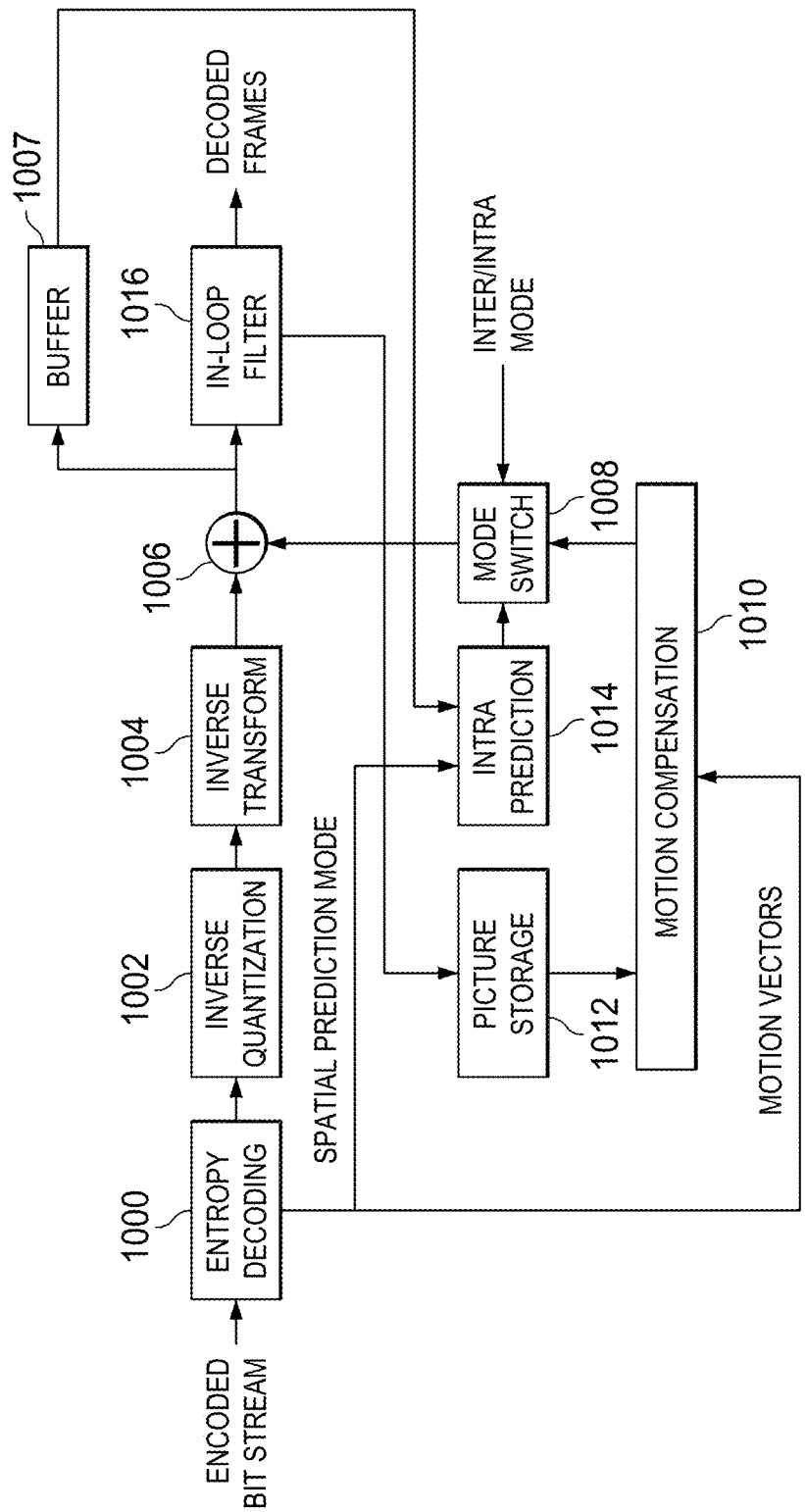
FIG. 10 is a block diagram of a video decoder.

FIG. 10 shows a block diagram of an example video decoder. The video decoder operates to reverse the encoding operations, i.e., entropy coding, quantization, transformation, and prediction, performed by the video encoder of FIG. 10 to regenerate the pictures of the original video sequence. In view of the above description of a video encoder, one of ordinary skill in the art will understand the functionality of components of the video decoder without detailed explanation.

The entropy decoding component 1000 receives an entropy encoded (compressed) video bit stream and reverses the entropy coding to recover the encoded PUs and header information such as the prediction modes, the encoded CU and PU structures of the LCUs, ALF parameters such as the filter types and filter coefficient set(s) and SAO parameters. If the decoded prediction mode is an inter-prediction mode, the entropy decoder 1000 then reconstructs the motion vector(s) as needed and provides the motion vector(s) to the motion compensation component 1010.

The inverse quantization component 1002 de-quantizes the quantized transform coefficients of the residual CU. The inverse transform component 1004 transforms the frequency domain data from the inverse quantization component 1002 back to the residual CU. That is, the inverse transform component 1004 applies an inverse unit transform, i.e., the inverse of the unit transform used for encoding, to the dequantized residual coefficients to produce the residual CUs.

A residual CU supplies one input of the addition component 1006. The other input of the addition component 1006 comes from the mode switch 1008. When an inter-prediction mode is signaled in the encoded video stream, the mode switch 1008 selects predicted PUs from the motion compensation component 1010 and when an intra-prediction mode is signaled, the mode switch selects predicted PUs from the intra-prediction component 1014.

The motion compensation component 1010 receives reference data from storage 1012 and applies the motion compensation computed by the encoder and transmitted in the encoded video bit stream to the reference data to generate a predicted PU. That is, the motion compensation component 1010 uses the motion vector(s) from the entropy decoder 1000 and the reference data to generate a predicted PU.

The intra-prediction component 1014 receives reconstructed samples from previously reconstructed PUs of a current picture from the buffer 1007 and performs the intra-prediction computed by the encoder as signaled by an intra-prediction mode transmitted in the encoded video bit stream using the reconstructed samples as needed to generate a predicted PU.

The addition component 1006 generates a reconstructed CU by adding the predicted PUs selected by the mode switch 1008 and the residual CU. The output of the addition component 1006, i.e., the reconstructed CUs, supplies the input of the in-loop filter component 1016 and is also stored in the buffer 1007 for use by the intra-prediction component 1014.

The in-loop filter component 1016 applies the same filters to the reconstructed picture data as the encoder, i.e., a deblocking filter, an SAO, and an ALF, in the same order to improve the quality of the reconstructed picture data. The output of the in-loop filter component 1016 is the decoded pictures of the video bit stream. Further, the output of the in-loop filter component 1016 is stored in storage 1012 to be used as reference data by the motion compensation component 1010.

Figure 11:
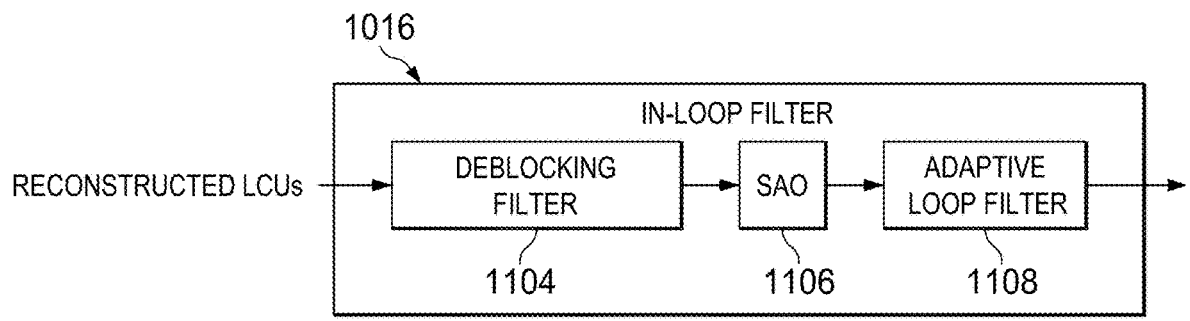
FIG. 11 is a block diagram of the in-loop filter component of the video decoder.

FIG. 11 shows the in-loop filter component 1016 in more detail. The filters included in the in-loop filter component 1016 include a deblocking filter 1104, a sample adaptive offset filter (SAO) 1106, and an adaptive loop filter (ALF) 1108. The deblocking filter 1104 operates in the same manner as the deblocking filter of the encoder. The ALF 1108 may be region-based and applies the filter type and the region specific coefficients signaled by the encoder to filtering regions of a picture. Embodiments of the ALF 1108 may implement techniques for region-based filtering as described herein in reference to the method of FIG. 17. The SAO filter 1106 may be region-based and applies the region specific offsets signaled by the encoder to filtering regions of a picture. Embodiments of the SAO filter 1106 may implement techniques for region-based filtering as described herein in reference to the method of FIG. 17.

Figure 12:
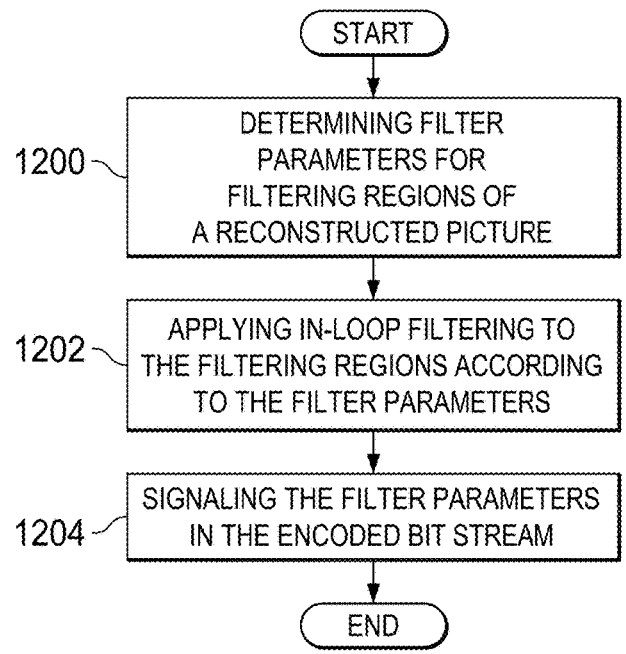
FIG. 12 is a flow diagram of a method for region-based in-loop filtering in an encoder.

FIG. 12 is a flow diagram of a method for region based in-loop filtering that may be performed in a video encoder, e.g., the encoder of FIG. 8. As is explained in more detail below, in some embodiments, the in-loop filtering may be SAO filtering and in some embodiments, the in-loop filtering may be ALF. Referring now to FIG. 12, filter parameters for filtering regions of a reconstructed picture are determined 1200 for the type of in-loop filtering to be performed, e.g., ALF or SAO filtering. The filter parameters may be determined independently for each of the filtering regions. More specifically, the filter parameters whose values are determined based on reconstructed pixel values (e.g., selection of a filter coefficient set for ALF or offset values in SAO filtering) may be determined for each region and are determined based on the pixels of that region alone. In some embodiments, after the filter parameters for filtering regions are determined, a merging scheme may be applied to determine if filtering regions can combined and a single set of filter parameters sent for the combined regions. The determination of SAO filter parameters for each of the filtering regions may be similar to that used for determining the parameters for a single region in quadtree based SAO. The determination of ALF filter parameters for each of the filtering regions may be similar to that used for the known versions of region based ALF.

The filtering regions may be formed by partitioning the LCUs of the reconstructed picture into M×N LCU aligned regions, where M and N are integers. In some embodiments, the filtering regions are formed by partitioning the LCUs of the reconstructed picture into 4×4 LCU aligned regions. Such partitioning is previously described herein and is illustrated in FIGS. 4 and 6.

In some embodiments, the filtering regions are formed by partitioning the LCUs of the reconstructed picture into 16×1 LCU aligned regions as shown in FIG. 13. The width of each of these filtering regions is the width of the picture and the height may be determined as follows:

$$yHeight=(((PicHeightInLCUs+1)>>4)<<Log\ 2LCU\text{-}Size)$$

where Log 2LCUSize is log 2(LCUSize), e.g., if the LCU size is 64, log 2LCUsize will be 6. These horizontal filtering regions may be better to use in low latency applications than the 4×4 LCU aligned regions as their shape better aligns with raster-scan order LCU processing. That is, the deblocked LCUs of filtering region R0 will be available before any of the deblocked LCUs of filtering region R1. Thus, the determination of filtering parameters for R0 can be started while the encoder is working on the LCUs of the next region. Consider the simple example of FIG. 14. In this example, a picture with 16 rows of 16 LCUs is divided into the 16 LCU aligned 16×1 filtering regions. Assuming raster scan order, before the determination of the filter parameters for filtering region R0 can begin, only the deblocked LCUs 0-15 need to be available. Contrast this with the 4×4 LCU aligned regions in the example of FIG. 6. The deblocked LCUs of filtering region R0 in FIG. 6 will not be available until at least LCUs 0-51 are processed by the encoder.

Referring again to FIG. 12, the in-loop filtering is applied 1202 to the filtering regions according to the filter parameters. More specifically, the in-loop filtering of the type for which the region filter parameters were determined, e.g., ALF or SAO filtering, is performed on each filtering region according to the filter parameters determined for that filtering region. Note that each filtering region can be filtered independently as there is no dependency on other regions. Further, the filtering can be performed as soon as the filtering parameters are determined.

Figure 15:
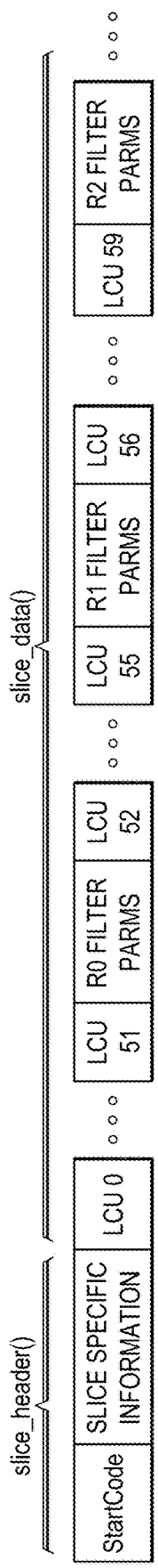
FIG. 15 is an example of region based filter parameter signaling with 4×4 LCU aligned filtering regions.
Figure 16:
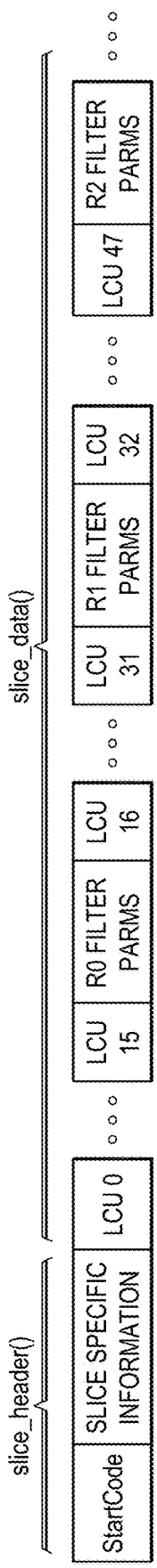
FIG. 16 is an example of region based filter parameter signaling with 16×1 LCU aligned filtering regions.

The filter parameters for each region are also signaled 1204 in the encoded video bit stream. In some embodiments, the filter parameters are signaled in the slice header of the slice in which the LCU data of the regions is encoded. In some embodiments, the filter parameters for each region are signaled at the end of the encoded region data. That is, the filter parameters for a region are signaled following the encoded data of the last LCU in the region. For example, consider the example 4×4 LCU aligned region configuration of FIG. 6. The filter parameters for each of these regions would be signaled as shown in the example of FIG. 15. Note that filter parameters for filtering region R0 are signaled after the data of LCU 51 as that is the last LCU in filtering region R0. Also note that some delay is incurred before these parameters can be signaled due to the raster scan ordering of LCU data in the encoded bit stream. In another example, consider the example 16×1 LCU aligned region configuration of FIG. 14. The filter parameters for each of these regions would be signaled as shown in the example of FIG. 16. Due to the alignment of the filtering regions with the raster scan LCU ordering, the delay incurred in signaling the filter parameters for filtering region R0 in this example will be less than that incurred for filtering region R0 in FIG. 15.

Figure 17:
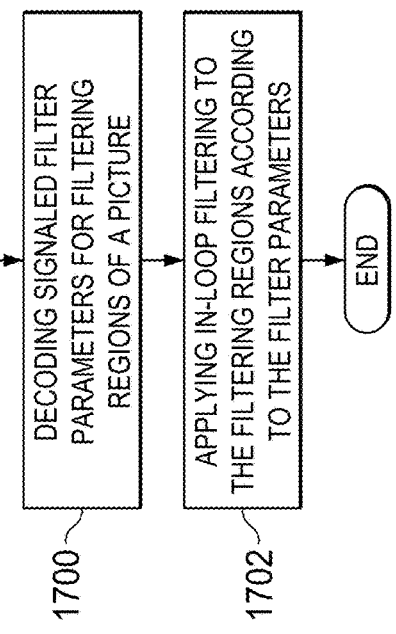
FIG. 17 is a flow diagram of a method for region-based in-loop filtering in a decoder.

FIG. 17 is a flow diagram of a method for region based in-loop filtering that may be performed in a video decoder, e.g., the decoder of FIG. 10. As is explained in more detail below, in some embodiments, the in-loop filtering may be SAO filtering and in some embodiments, the in-loop filtering may be ALF. Referring now to FIG. 17, signaled filter parameters for filtering regions of a picture are decoded 1800 from the encoded bit stream. In some embodiments, the filter parameters are for SAO filtering of the filtering regions. In some embodiments, the filter parameters are for ALF filtering of the filtering regions.

In some embodiments, the filter parameters for the filtering regions are decoded from a slice header prior to decoding the LCU data of the filtering regions. In some embodiments, the filter parameters for each of the filtering regions are encoded in the bit stream following the data of the last LCU in the filtering region as previously described. In such embodiments, the filter parameters for a filtering region are decoded after all the LCU data of the filtering region. Note that this avoids the delay incurred when the filter parameters are encoded in the slice header.

In-loop filtering, e.g., ALF or SAO filtering, is applied 1702 to the filtering regions according to the filter parameters for each filtering region. The configuration of the filtering regions, e.g., 4×4 LCU aligned or 16×1 LCU aligned, may be known to the decoder or may be signaled in the encoded bit stream.

Figure 18:
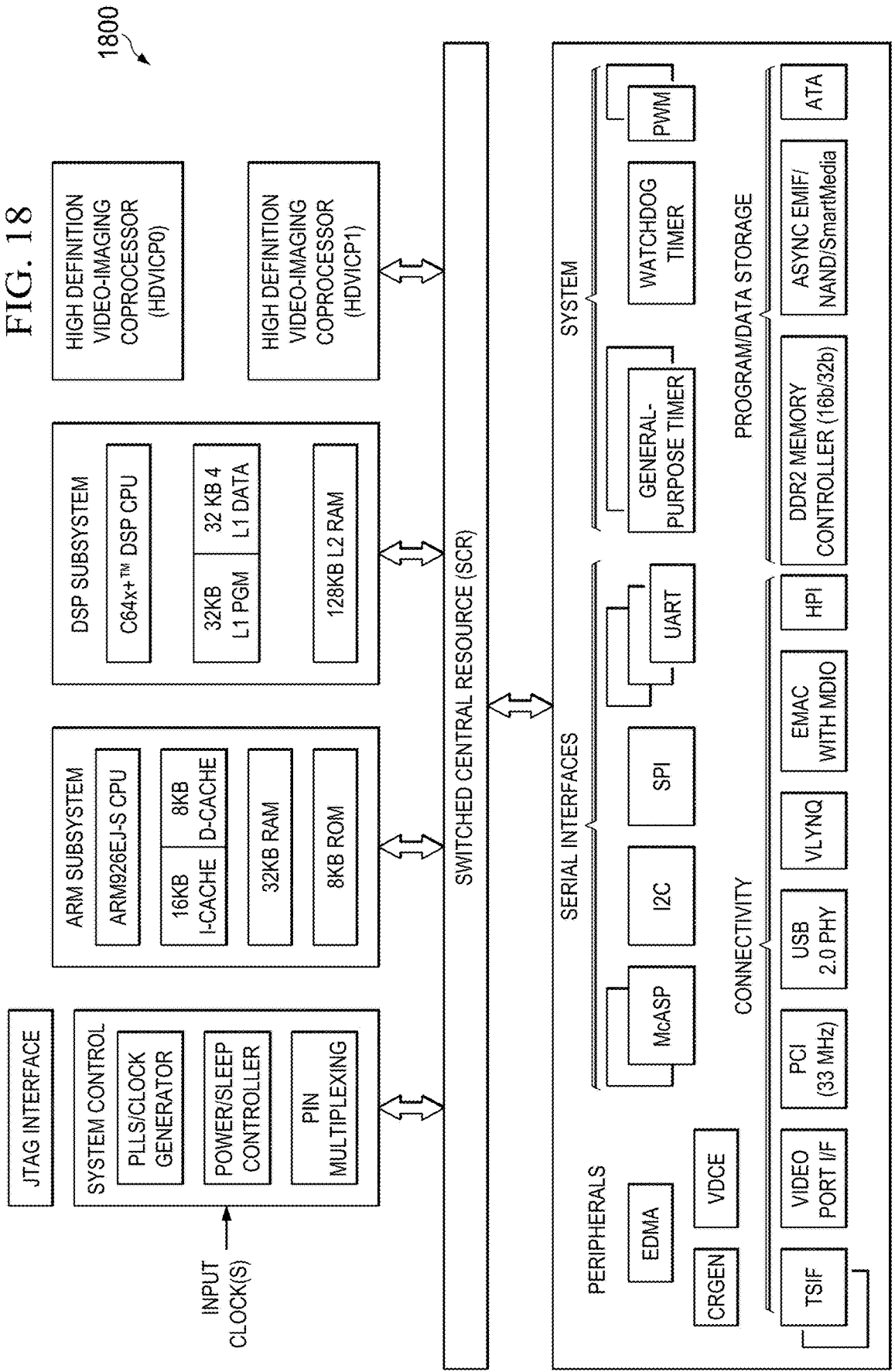
FIG. 18 is a block diagram of an illustrative digital system.

FIG. 18 is a block diagram of an example digital system suitable for use as an embedded system that may be configured to perform region-based in-loop filtering as described herein during encoding of a video stream and/or region-based in-loop filtering during decoding of an encoded video bit stream. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1800 is a programmable platform designed to meet the processing needs of applications such as video encode/decode/transcode/transrate, video surveillance, video conferencing, set-top box, medical imaging, media server, gaming, digital signage, etc. The SoC 1800 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1800 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1800, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1800 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 18, the SoC 1800 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1800 may be configured to perform region based in-loop filtering during video encoding and/or region based in-loop filtering during decoding of an encoded video bitstream using methods described herein. For example, the coding control of the video encoder of FIG. 8 may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. At least some of the computational operations of the region based in-loop filtering during encoding of a video stream may also be executed on the HDVICP coprocessors. Similarly, at least some of the computational operations of the various components of the video decoder of FIG. 10, including entropy decoding, inverse quantization, inverse transformation, intra-prediction, and motion compensation may be executed on the HDVICP coprocessors. Further, at least some of the computational operations of the region based in-loop filtering during decoding of an encoded video bit stream may also be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, one of ordinary skill in the art will understand embodiments in which ALF uses only one filter type rather than selecting a filter type from multiple filter types.

In another example, particular SAO filter types, edge directions, pixel categories, numbers of offset values, etc., drawn from versions of the emerging HEVC standard have been described herein. One of ordinary skill in the art will understand embodiments in which the SAO filter types, edge directions, pixel categories, number of offset values, and/or other specific details of SAO filtering differ from the ones described.

In another example, embodiments of the invention are described in which filter parameters for filtering regions are signaled after the regions in the encoded bit stream. This signaling technique may reduce delay in the encoder at the expense of increasing delay in the decoder. In some embodiments, the filter parameters for each filtering region may be signaled before the regions rather than after. This signaling technique may increase delay in the encoder while decreasing delay in the decoder.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method comprising:
   determining filter parameters for each filtering region of a plurality of filtering regions of a reconstructed picture based on pixels in the respective filtering region;
   applying in-loop filtering to each filtering region according to the filter parameters determined for the respective filtering region; and
   signaling the filter parameters for each filtering region in an encoded video bit stream, wherein the filter parameters for at least one of the respective filtering regions are signaled between encoded data of a final coding unit (CU) in the respective filtering region and encoded data of a CU that is signaled next in the encoded video bit stream after the final CU,
   wherein the in-loop filtering is selected from a group consisting of adaptive loop filtering and sample adaptive offset filtering.

2. The method of claim 1, wherein the plurality of filtering regions are determined by partitioning CUs of the reconstructed picture into 4×4 CU aligned regions.

3. The method of claim 1, wherein the plurality of filtering regions are determined by partitioning CUs of the reconstructed picture into N×1 CU aligned regions, wherein N is an integer.

4. The method of claim 3, wherein N=16.

* * * * *